(12) United States Patent
Yamashita

(10) Patent No.: US 8,425,118 B2
(45) Date of Patent: Apr. 23, 2013

(54) DAMPER STRUCTURE AND ROTARY MACHINE

(75) Inventor: Katsuya Yamashita, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/143,393

(22) PCT Filed: Jan. 8, 2010

(86) PCT No.: PCT/JP2010/000094
§ 371 (c)(1),
(2), (4) Date: Jul. 6, 2011

(87) PCT Pub. No.: WO2010/079767
PCT Pub. Date: Jul. 15, 2010

(65) Prior Publication Data
US 2011/0269558 A1 Nov. 3, 2011

(30) Foreign Application Priority Data
Jan. 9, 2009 (JP) .................... 2009-003705

(51) Int. Cl.
*F16C 27/02* (2006.01)

(52) U.S. Cl.
USPC ......................................................... 384/99

(58) Field of Classification Search .......... 188/378–380; 74/573 F; 384/99; 464/180
See application file for complete search history.

(56) References Cited

U.S. PATENT DOCUMENTS

| | | | | |
|---|---|---|---|---|
| 4,366,994 A * | 1/1983 | Yoshioka | ................ | 384/99 |
| 4,392,751 A * | 7/1983 | Ida et al. | ................ | 384/99 |
| 4,430,011 A * | 2/1984 | Kun | ................ | 384/99 |
| 4,605,316 A * | 8/1986 | Utecht | ................ | 384/99 |
| 5,058,452 A * | 10/1991 | El-Shafei | ................ | 464/180 |
| 5,613,781 A * | 3/1997 | Kuzdzal et al. | ................ | 384/99 |

(Continued)

FOREIGN PATENT DOCUMENTS

| JP | 62-062018 | 3/1987 |
|---|---|---|
| JP | 6-137325 | 5/1994 |

(Continued)

OTHER PUBLICATIONS

International Search Report issued Mar. 30, 2010 in International (PCT) Application No. PCT/JP2010/000094 w/English translation.

(Continued)

*Primary Examiner* — Christopher Schwartz
(74) *Attorney, Agent, or Firm* — Wenderoth, Lind & Ponack, L.L.P.

(57) ABSTRACT

A damper structure of the present invention is provided on a shaft end (3a) of a spindle shaft (3) supported by a bearing, which shaft end (3a) extends outwardly from the bearing, and includes: a sleeve (11) provided around an outer circumference of the shaft end 3a); a housing (12) provided in a spaced manner from the sleeve (11) in a radial direction of the spindle shaft (3); and a moving portion (13) that moves the housing (12) and the sleeve (11) relatively in a spindle shaft direction, in which a squeeze film S (S1) is formed between an outer circumferential surface (11a) of the sleeve (11) and an inner circumferential surface (12b) of the housing (12) that face each other, and in which a formation area of the squeeze film S (S1) is variable.

16 Claims, 5 Drawing Sheets

U.S. PATENT DOCUMENTS

| | | | |
|---|---|---|---|
| 5,651,616 A | 7/1997 | Hustak et al. | |
| 5,906,535 A * | 5/1999 | Tonooka et al. | 451/50 |
| 7,517,152 B1 * | 4/2009 | Walsh | 384/99 |
| 2007/0248293 A1 | 10/2007 | Pettinato et al. | |
| 2009/0274400 A1 * | 11/2009 | Yamashita et al. | 384/99 |

FOREIGN PATENT DOCUMENTS

| | | |
|---|---|---|
| JP | 11-501389 | 2/1999 |
| JP | 2001-304342 | 10/2001 |
| JP | 2003-28146 | 1/2003 |
| JP | 2007-93007 | 4/2007 |
| WO | 98/16754 | 4/1998 |
| WO | 2008/020483 | 2/2008 |

OTHER PUBLICATIONS

Written Opinion of the International Searching Authority issued Mar. 30, 2010 in International (PCT) Application No. PCT/JP2010/000094 w/English translation.

* cited by examiner

DAMPER STRUCTURE AND ROTARY MACHINE

TECHNICAL FIELD

The present invention relates to a damper structure and a rotary machine that are capable of obtaining a desired vibration characteristic.

Priority is claimed on Japanese Patent Application No. 2009-003705, filed on Jan. 9, 2009, the content of which is incorporated herein by reference.

BACKGROUND ART

Typically, there are cases where rotary, machines represented by compressors and steam turbines become unable to continue operation because a fluid-like, unstabilizing force produced under specific conditions of use causes their spindle shafts to vibrate unstably. To prevent such an unstable vibration, efforts are made to optimize the bearing characteristic (vibration characteristic) so as to make the spindle shafts stable under all the conditions of use in consideration of the unstabilizing force. The optimization of the vibration characteristic is performed by adjusting the clearance, preload, or the like of the bearing. However, the clearance, preload, or the like is heavily influenced by the dimensional tolerance or erection tolerance of the bearing. Therefore, there are cases where the clearance or preload of the bearing actually fabricated fails to offer the target vibration characteristic, leading to production of an unstable vibration.

To suppress such unstable vibration, there is adopted a squeeze film damper for applying additional damping to the vibration of the spindle shaft to produce stabilization. The squeeze film damper is provided on the shaft end that extends externally from the bearing. The squeeze film damper effectively damps the vibration of the spindle shaft by use of a squeeze film (oil film) formed around the outer circumference of the shaft end. Thereby, the squeeze film damper suppresses the unstable vibration of the spindle shaft.

Patent Document 1 discloses one example of a damper structure utilizing such a squeeze film.

CITATION LIST

Patent Document 1: Japanese Unexamined Patent Application, First Publication No. S62-62018

To conform to the recent rotary machines with higher pressure and higher performance, the damper structure is required to securely exert the damper characteristic (vibration characteristic) defined in the design stage. However, in the conventional damper structure described above, the damper characteristic is heavily influenced by the clearance of the damper structure similarly to the bearing, leading to a problem in that the actual damper characteristic fails to be the target damper characteristic.

This produces an unstable vibration in the spindle shaft, resulting in a problem in that the continuation of the operation of the rotary machine is prevented.

SUMMARY OF INVENTION

The present invention has been achieved in consideration of such circumstances, and has the objects as follows:

(1) to provide a damper structure capable of bringing a vibration characteristic closer to the target vibration characteristic.

(2) to suppress production of an unstable vibration.

(3) to allow the rotary machine to continue stable operation.

To achieve the above objects, the present invention adopts the following.

(1) A damper structure according to the present invention includes: a sleeve provided around an outer circumference of the shaft end; a housing provided in a spaced manner from the sleeve in a radial direction of the spindle shaft; and a moving portion that moves the housing and the sleeve relatively in a spindle shaft direction, in which a squeeze film is formed between an outer circumferential surface of the sleeve and an inner circumferential surface of the housing that face each other, and in which a formation area of the formed squeeze film is variable.

With this construction, the moving portion moves the sleeve and the housing relatively in the spindle shaft direction. Therefore, the formation area of the squeeze film between the outer circumferential surface of the sleeve and the inner circumferential surface of the housing is varied. This can change the damper characteristic of the squeeze film. Consequently, even if the measured damper characteristic is different from the damper characteristic, the damper characteristic can be adjusted so as to be the target damper characteristic. Therefore, it is possible for the damper structure of the present invention to bring the vibration characteristic of the whole spindle shaft system closer to the target vibration characteristic, and hence, to suppress the production of an unstable vibration of the spindle shaft.

In the present specifications, "formation area of a squeeze film" refers to "position, size, and range where a squeeze film is formed."

(2) In the damper structure as set forth above in (1), the inner circumferential surface of the housing and the outer circumferential surface of the sleeve are each formed with a fixed diameter along the spindle shaft direction. Therefore, the squeeze film formed between the outer circumferential surface of the sleeve and the inner circumferential surface of the housing may be formed in a cylindrical shape, and a length of the squeeze film in the spindle shaft direction may be variable.

With this construction, the inner circumferential surface of the housing and the outer circumferential surface of the sleeve are each formed with a fixed diameter. Therefore, relative movement of the housing and the sleeve in the spindle shaft direction increases/decreases the range in which the inner circumferential surface of the housing and the outer circumferential surface of the sleeve face each other along the spindle shaft direction. In other words, the length of the formation area of the squeeze film in the spindle shaft direction increases/decreases to vary the length (width) of the squeeze film in the spindle shaft direction. This makes it possible to adjust the damper characteristic with high accuracy, and hence, to suppress the production of an unstable vibration more reliably.

(3) In the damper structure as set forth above in (1), the inner circumferential surface of the housing and the outer circumferential surface of the sleeve each includes a tapered surface that gradually decreases in diameter toward either end portion in the spindle shaft direction. Therefore, the squeeze film formed between the outer circumferential surface of the sleeve and the inner circumferential surface of the housing may be formed in a tapered shape, and a thickness of the squeeze film in the radial direction may be variable.

With this construction, the inner circumferential surface of the housing and the outer circumferential surface of the sleeve are tapered surfaces. Therefore, relative movement of the sleeve and the housing in the spindle shaft direction increases/ decreases the distance between the inner circumferential surface and the outer circumferential surface in the normal direction. In other words, the formation area of the squeeze film is increased/decreased in thickness, thereby varying the thickness of the squeeze film. This can significantly change the damper characteristic. Therefore, even if the damper characteristic is widely different from the target damper characteristic, it is possible to adjust the damper characteristic according to the varied thickness of the squeeze film, and hence, to suppress the production of an unstable vibration.

(4) In the damper structure as set forth above in (1), the inner circumferential surface of the housing and the outer circumferential surface of the sleeve may each include a plurality of stepped surfaces that are formed with different diameters so as to have a stepped shape toward a front end portion thereof in the spindle shaft direction, and the squeeze film may be formed along a position, on one-on-one basis, at which one of the stepped surfaces formed in the inner circumferential surface of the housing and one of the stepped surfaces formed in the outer circumferential surface of the sleeve face each other, and one of the squeeze films that are different in position in the radial direction may be selectable.

With this construction, one squeeze film is selectable from among the squeeze films at positions different in the radial direction. Therefore, when the sleeve and the housing are moved relatively in the spindle shaft direction, the squeeze film is altered to one at a position different in the radial direction. This allows significant change in the damper characteristic. Therefore, even if the damper characteristic is widely different from the damper characteristic, it is possible to adjust the damper characteristic according to the position of the squeeze film different in the radial direction, and hence, to suppress the production of an unstable vibration.

(5) The moving portion of the damper structure as set forth above in (1) may include a servo motor.

With this construction, it is possible to position the housing and the sleeve with accuracy. Therefore, it is possible to vary the formation area of the squeeze film with accuracy.

(6) A rotary machine according to the present invention includes the damper structure with any one of the above-mentioned constructions.

With this construction, the rotary machine includes the damper structure with any one of the above-mentioned constructions. Therefore, it is possible to ideally damp the spindle shaft, and hence, to suppress the production of an unstable vibration. As a result, it is possible to continue the operation of the rotary machine with stability.

Advantageous Effects of the Invention

According to the present invention, the moving portion relatively moves the sleeve and the housing. Therefore, the formation area of the squeeze film between the outer circumferential surface of the sleeve and the inner circumferential surface of the housing is varied. This can change the damper characteristic of the squeeze film. Consequently, even if the measured damper characteristic is different from the damper characteristic, the damper characteristic can be adjusted to the target damper characteristic. Therefore, it is possible for the damper structure of the present invention to bring the vibration characteristic of the whole spindle shaft system closer to the target vibration characteristic, and hence, to suppress the production of an unstable vibration of the spindle shaft.

DETAILED DESCRIPTION OF THE INVENTION

Hereunder is a description of the embodiments of the present invention with reference to the drawings.

First Embodiment

Figure 1:
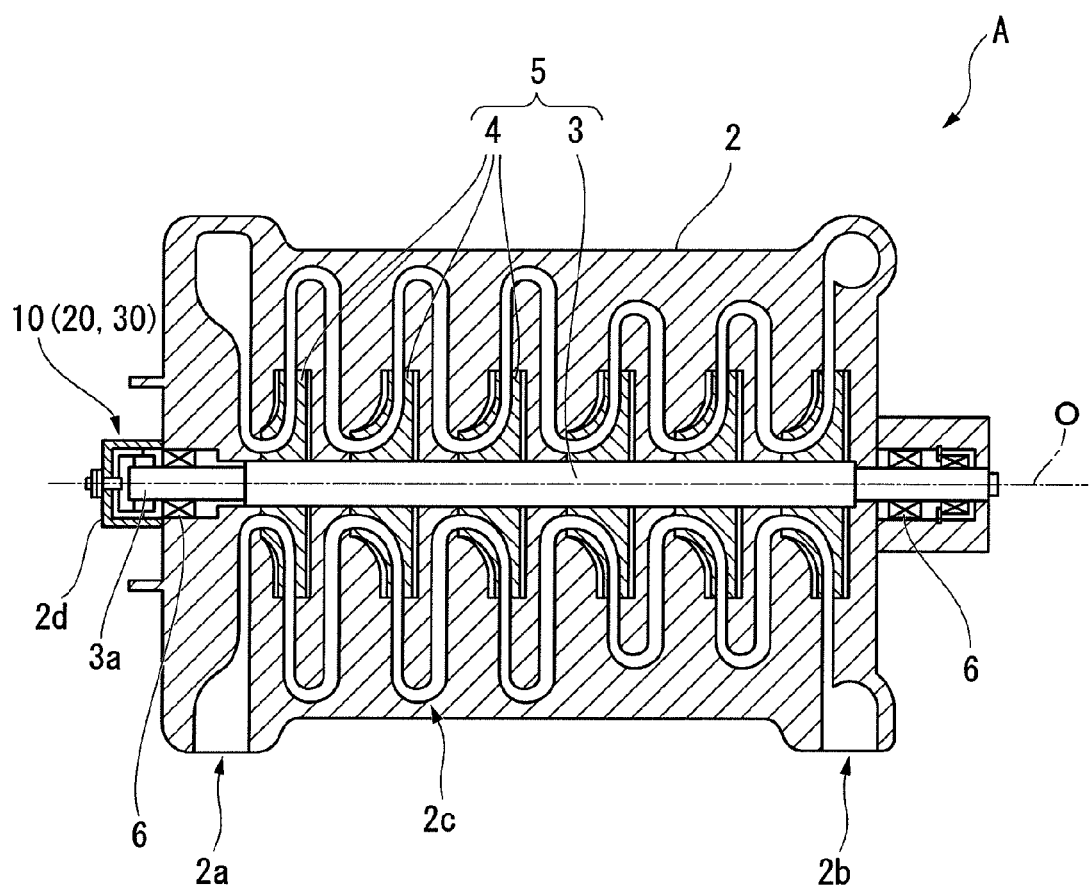
FIG. 1 is a transverse cross-sectional view showing a general construction of a centrifugal compressor A in embodiments of the present invention.

FIG. 1 is a transverse cross-sectional view showing a general construction of a centrifugal compressor A according to a first embodiment of the present invention. The centrifugal compressor A includes: a casing 2; a multi-stage rotor 5 made of a shaft (spindle shaft) 3 and a plurality of impellers 4; bearings 6 that rotatably support the shaft 3 at portions in the vicinity of its both ends; and a damper structure 10 provided on a first end of the shaft 3, that is, a shaft end 3a.

The casing 2 internally has a container space for the multi-stage rotor 5, and includes: a suction port 2a that introduces a gas to be compressed; a flow passage 2c that communicates between the impellers 4 for allowing the stepwise-compressed fluid to flow through; and a discharge port 2b that sends the compressed gas out.

The casing 2 further includes a shaft end case portion 2d that externally protrudes from its first end face. The shaft end case portion 2d will be described together with the later-described damper structure 10.

In the multi-stage rotor 5, the shaft 3 is fixed in a state of penetrating through the plurality of impellers 4 so that a rotation axis of the impellers 4 are coaxial with a rotation axis O of the shaft 3.

The shaft 3 is provided so as to extend in a longitudinal direction of the casing 2 and penetrate through a container space of the casing 2. The shaft 3 is coupled to a drive source (not shown in the figure) for rotation.

The plurality of impellers 4 are fixed to the shaft 3 with a predetermined distance spaced from each other along a rotation axis O direction. Each impeller 4 has a plurality of blades (not shown in the figure) provided on its disk. A shroud is attached around the tips of the blades. The space formed between the disk and the shroud is a flow passage functioning as a route for a gas to be compressed, and is connected to the flow passage 2c in the casing 2.

Two bearings 6 are fixed to the casing 2, and rotatably support the portions in the vicinity of both ends of the shaft 3. The bearings 6 are tilting pad bearings whose clearance is set so as to provide a predetermined bearing characteristic.

With such a construction, rotation of the shaft 3 causes the plurality of impellers 4 fixed to the shaft 3 to rotate in the centrifugal compressor A. By the rotating impellers 4, a fluid such as hydrogen is passed in a radial direction of the impellers 4. Thereby, the fluid is compressed by the centrifugal force.

Figure 2:
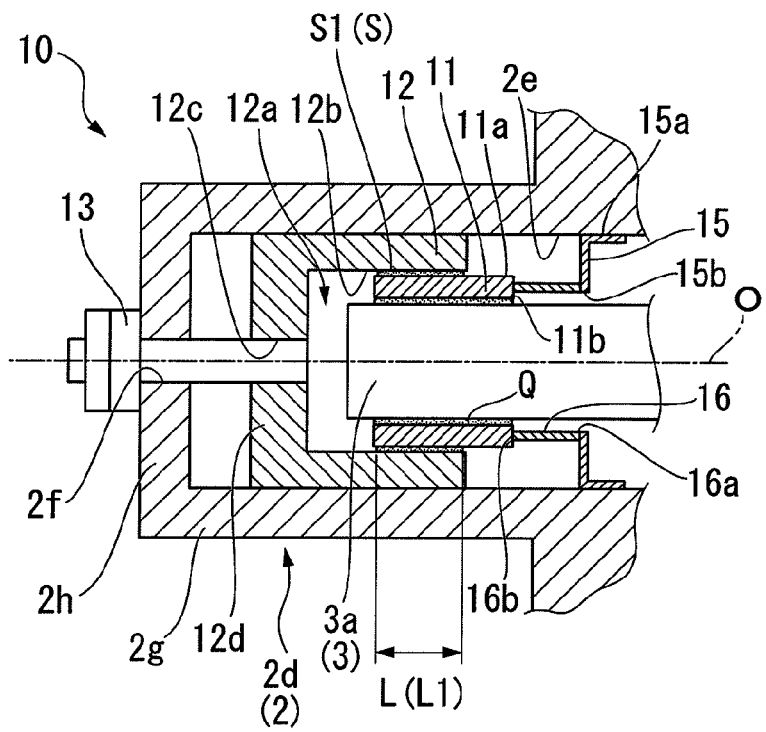
FIG. 2 is an enlarged cross-sectional view of a part of a centrifugal compressor A according to a first embodiment of the present invention, which shows a schematic construction of a damper structure 10.

FIG. 2 is an enlarged cross-sectional view of a part of the centrifugal compressor A, which shows a schematic construction of the damper structure 10.

As shown in FIG. 2, the damper structure 10 is provided in the shaft end case portion 2d of the casing 2. The shaft end case portion 2d protrudes annularly from the first end face of the casing 2 in the rotation axis O direction. The shaft end case portion 2d includes: a surrounding wall portion 2g that surrounds the shaft end 3a; and an end wall portion 2h that substantially closes an end portion of the surrounding wall portion 2g. In the end wall portion 2h, there is formed a through-hole 2f that is positioned on the rotation axis O.

The damper structure 10 includes: a sleeve 11 provided on an outer circumference of the shaft end 3a; a housing 12 provided in a manner spaced from the sleeve 11 in the radial direction of the shaft 3; and an adjusting bolt (moving portion) 13 that moves the housing 12 and the sleeve 11 relatively in the spindle shaft direction.

The sleeve 11 has a cylindrical shape, and is positioned in a state of surrounding the shaft end 3a with a gap being provided therebetween. The positioning of the sleeve 11 is performed by an annular member 15 and a centering spring 16.

The annular member 15 has an outer edge 15a fixed to an inner wall surface 2e of the casing 2 with its axis line being in line with the rotation axis O. Through the annular member 15, the shaft 3 extends.

The centering spring 16 is a spring member made of spring steel, which is formed into a cylindrical shape. With its axis line being in line with the rotation axis O, a first end portion 16a of the centering spring 16 is fixed to an inner edge 15b of the annular member 15. Furthermore, a second end portion 16b of the centering spring 16 is fixed to an end face 11b of the sleeve 11. The centering spring 16 is configured so as to be displaced only in the radial direction and so as not to be displaced in the rotation axis O direction and the circumferential direction.

By the centering spring 16, the displacement of the sleeve 11 is allowed only in the radial direction, and the displacement of the sleeve 11 is restricted in the rotation axis O direction and the circumferential direction. An oil film Q is formed in the gap between the sleeve 11 and the shaft 3. The oil film Q functions as a bearing.

The housing 12 is a substantially U-shaped member, and internally has a cylindrical hole 12a whose inner diameter is slightly larger than an outer diameter of the sleeve 11. A female thread portion 12c that penetrates through the bottom portion 12d is formed at substantially the center of a bottom portion 12d of the housing 12.

The housing 12 is contained internally in the shaft end case portion 2d of the casing 2 so as to be movable in the rotation axis O direction and also unrotatable. The central axes of the cylindrical hole 12a and the female thread portion 12c are in line with the rotation axis O of the shaft 3. In this state, in the housing 12, at least a part of the sleeve 11 is contained in the cylindrical hole 12a, and a gap is formed between an inner circumferential surface 12b of the cylindrical hole 12a and an outer circumferential surface 11a of the sleeve 11.

The adjusting bolt (moving portion) 13 is screwed into the female thread portion 12c of the housing 12 in a state of being inserted into the through-hole 2f from the outside. The adjusting bolt 13 is attached to the shaft end case portion 2d so as to be immovable in the rotation axis O direction and also rotatable.

With such a construction, oil supplied from an oil supply portion (not shown in the figure) forms a cylindrical squeeze film S1 in the gap that is formed between the inner circumferential surface 12b of the cylindrical hole 12a and the outer circumferential surface 11a of the sleeve 11.

Here, a method of mathematically finding a damping coefficient C related to the damper structure utilizing a squeeze film will be described. A damping coefficient C is typically found by multiplying a reference spring constant a, which will be found from the formula (1) below, by a previously-found dimensionless constant $C_0$.

$$a = \frac{1}{\pi}\mu L(R/C)^3 \quad \text{(Formula 1)}$$

where R=an outer radius of a squeeze film (an inner radius of an external cylinder), L=a width of the squeeze film (a length of the squeeze film in the spindle shaft direction, c=a thickness of the squeeze film (a difference between the inner radius of the external cylinder and the outer radius of the internal cylinder), and ω=a vibration angular velocity.

In the above description, the external cylinder corresponds to the housing 12 and the internal cylinder corresponds to the sleeve 11 in the present embodiment.

Next is a description of an operation of the centrifugal compressor A with the aforementioned construction, and how to adjust the vibration characteristic of the damper structure 10.

Firstly, at the design stage, predetermined dimensions and predetermined clearances are set to the shaft 3, the bearings 6, and the damper structure 10 of the centrifugal compressor A so that the whole spindle shaft system has a target vibration characteristic. With reference to the preset dimensions and clearances, the constituent members are fabricated with predetermined dimensional tolerances. Then, the constituent members are assembled with predetermined positional tolerances and assembling tolerances. With these tolerances, the assembled bearings 6 and the damper structure 10 have a vibration characteristic slightly different from the target vibration characteristic.

Next, the centrifugal compressor A is started, and the vibration characteristic of the whole spindle shaft system of the centrifugal compressor A is actually measured.

The aforementioned vibration characteristic that is slightly different from the target vibration characteristic produces an unstable vibration in the shaft 3 under specific conditions of use. After measurement of the vibration characteristic in all the conditions of use, the centrifugal compressor A is caused to stop.

Next, the adjusting bolt 13 of the damper structure 10 is rotated so as to match the measured vibration characteristic with the target vibration characteristic, to thereby adjust the damper characteristic of the damper structure 10.

The adjusting bolt 13 is immovable in the rotation axis O direction. Therefore, rotation of the adjusting bolt 13 causes the housing 12 to threadingly move in the rotation axis O direction via the female thread portion 12c.

The threading movement of the housing 12 in the rotation axis O direction changes the relative position between the housing 12 and the shaft end 3a whose position is non-changing in the rotation axis O direction. This increases/decreases a width L (a length in the rotation axis O direction) of the squeeze film S1. For example, if the measured vibration characteristic of the whole spindle shaft system is larger than the target vibration characteristic as shown in FIG. 1, then a width L1 shown in FIG. 2 is reduced to a width L2 shown in FIG. 3 to adjust the damper characteristic so as to decrease the damping coefficient C. At this time, a thickness c of the squeeze film S1 is non-changing.

The increase/decrease in width L of the squeeze film has, as shown in Formula (1), a less influence on the increase/decrease in the damping coefficient C than the increase/decrease in outer radius R of the squeeze film and in thickness c of the squeeze film has. Therefore, it is possible to adjust the damping coefficient C with accuracy.

In this manner, the vibration characteristic of the whole spindle shaft system of the centrifugal compressor A is adjusted to the target vibration characteristic.

When the centrifugal compressor A is restarted after readjustment of the vibration characteristic, the operation of the centrifugal compressor A is continued in a stable state without an unstable vibration of the shaft 3 because the vibration characteristic of the whole spindle shaft system of the centrifugal compressor A is the target vibration characteristic.

As described above, according to the damper structure 10 of the present embodiment, the adjusting bolt 13 moves the sleeve 11 and the housing 12 relatively in the rotation axis O direction. This varies the formation area of the squeeze film S1 that is formed between the outer circumferential surface 11a of the sleeve 11 and the inner circumferential surface 12b of the housing 12. This makes it possible to change the damper characteristic of the squeeze film S1. Therefore, even if the measured vibration characteristic of the whole spindle shaft system is different from the target vibration characteristic, the vibration characteristic can be adjusted so as to be equal to the target vibration characteristic. Accordingly, it is possible to bring the vibration characteristic of the whole spindle shaft system of the centrifugal compressor A closer to the target vibration characteristic, and hence, to suppress the production of an unstable vibration of the shaft 3.

Each of the inner circumferential surface 12b of the housing 12 and the outer circumferential surface 11a of the sleeve 11 is formed with a fixed diameter. Therefore, relative movement of the housing 12 and the sleeve 11 in the rotation axis O direction increases/decreases the range in which the inner circumferential surface 12b and the outer circumferential surface 11a face each other in the rotation axis O direction. In other words, the formation area of the squeeze film S1 is increased/decreased in length in the rotation axis O direction, thus varying the length (width) of the squeeze film S1 in the spindle shaft direction. This makes it possible to adjust the damper characteristic highly accurately, and hence, to suppress the production of an unstable vibration of the shaft 3 more reliably.

Furthermore, according to the centrifugal compressor A, which includes the damper structure 10, it is possible to ideally damp the vibration of the shaft 3, and hence, to suppress the production of an unstable vibration. As a result, the operation of the centrifugal compressor A can be continued in a stable state.

Second Embodiment

Figure 3:
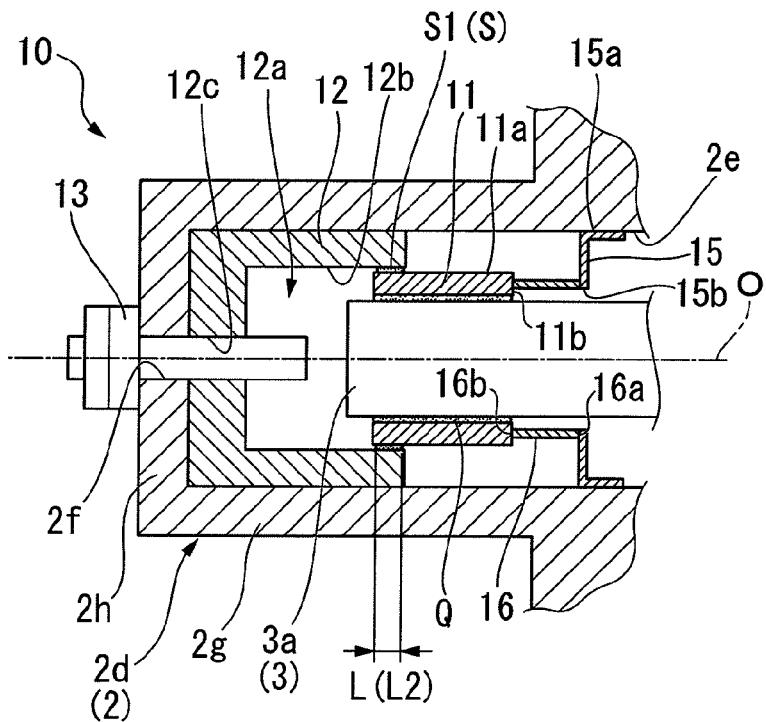
FIG. 3 is a diagram showing an operation of the damper structure 10 according to the first embodiment of the present invention.
Figure 4:
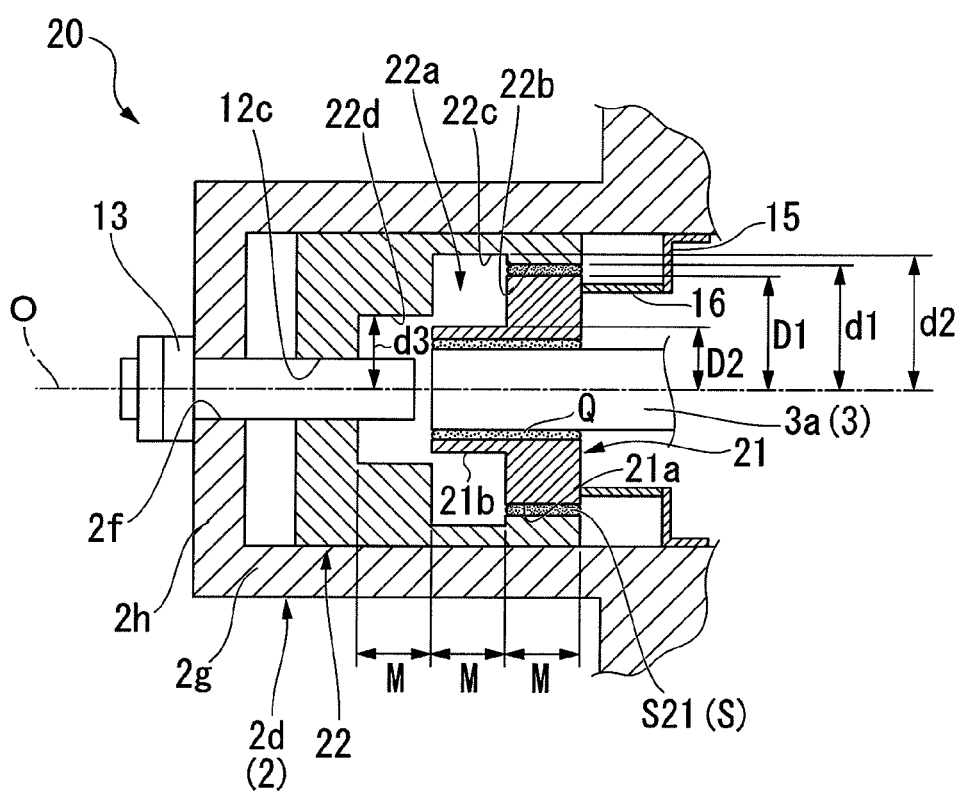
FIG. 4 is a transverse cross-sectional view showing a damper structure 20 according to a second embodiment of the present invention.
Figure 5:
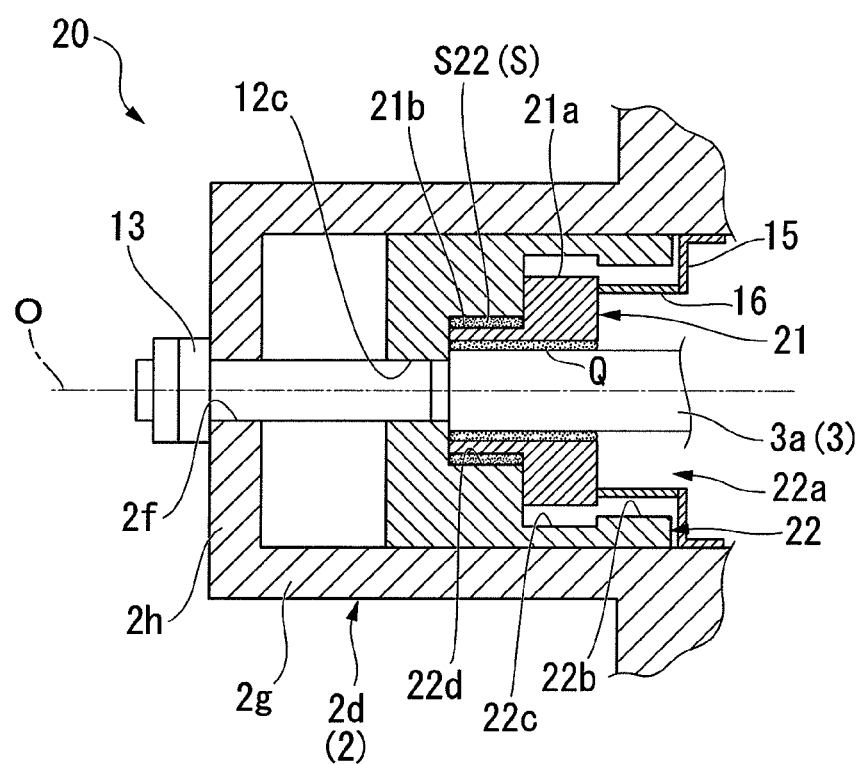
FIG. 5 is a diagram showing an operation of the damper structure 20 according to the second embodiment of the present invention.

Next is a description of a second embodiment of the present invention. The second embodiment described below is one in which the damper structure 10 of the centrifugal compressor A according to the aforementioned first embodiment (see FIG. 1) is modified. FIG. 4 is a transverse cross-sectional view showing a damper structure 20 according to the second embodiment of the present invention. In FIG. 4 and FIG. 5, constituent elements similar to those of FIG. 1 to FIG. 3 are denoted by the same reference symbols, and a description thereof is omitted.

As shown in FIG. 4, the damper structure 20 is attached to a shaft end case portion 2d. The damper structure 20 includes a sleeve 21 and a housing 22.

The sleeve 21 is a stepped cylindrical member that includes two different outer radii D1, D2 (D1>D2). Namely, an outer circumferential surface of the sleeve 21 has: a first outer circumferential surface (an outer circumferential surface) 21a that extends along a position spaced from a central axis by an outer radius D1; and a second outer circumferential surface (an outer circumferential surface) 21b that extends at a position spaced from the central axis by an outer radius D2. The first outer circumferential surface 21a and the second outer circumferential surface 21b have the same length M in a rotation axis O direction.

The sleeve 21 with such a construction is positioned, similarly to the sleeve 11 of the first embodiment, by an annular member 15 and a centering spring 16 while surrounding a shaft end 3a with a gap being provided therebetween.

The housing 22 is substantially U-shaped, and internally has a stepped hole 22a.

In the stepped hole 22a, three coaxial cylindrical spaces different in inner diameter are in communication with each other. To be more specific, the housing 22 includes three cylindrical spaces formed with inner radii d1 to d3 from its opening side to its bottom side.

The size relation among the inner radii d1 to d3 is d2>d1>d3. The inner radius d1 is slightly larger than the outer radius D1 of the sleeve 21. The inner radius d3 is slightly larger than the outer radius D2. In addition the difference between the inner radius d1 and the outer radius D1 is equal to the difference between the inner radius d3 and the outer radius D2.

The inner circumferential surface of the housing 22 has: a first inner circumferential surface (an inner circumferential surface) 22b that extends at a position spaced from the central axis by the inner radius d1; a second inner circumferential surface (an inner circumferential surface) 22c separated from the central axis by the inner radius d2; and a third inner circumferential surface (an inner circumferential surface) 22d separated from the central axis by the inner radius d3. The first inner circumferential surface 22b to the third inner circumferential surface 22d have the same length M in the rotation axis O direction.

The housing 22 is contained in the shaft end case portion 2d so as to be internally movable in the rotation axis O direction and also unrotatable. The central axes of the three cylindrical spaces and a female thread portion 12c are in line with the rotation axis O the shaft 3. The housing 22 contains at least a part of the sleeve 21 in its stepped hole 22a. The first inner circumferential surface 22b of the stepped hole 22a and the first outer circumferential surface 21a of the sleeve 21 face each other via a gap. The third inner circumferential surface 22d and the second outer circumferential surface 21b face each other via a gap.

Therefore, in the damper structure 20, oil is supplied from an oil supply portion (not shown in the figures) to alternatively form a cylindrical squeeze film S21 or S22 in the gap that is formed between the first inner circumferential surface 22b and the first outer circumferential surface 21a or in the gap that is formed between the third inner circumferential surface 22d and the second outer circumferential surface 21b.

Next is a description of how to adjust a damper characteristic of the damper structure 20 with the aforementioned construction. The whole operation of the centrifugal compressor A is similar to that in the aforementioned description. Therefore, the description thereof is omitted.

Firstly, the adjusting bolt 13 is rotated to threadingly move the housing 22 in the rotation axis O direction, and set the housing 22 at a position at which the first inner circumferential surface 22b and the first outer circumferential surface 21a face each other as shown in FIG. 4. The damper structure 20 uses the oil supplied from the oil supply portion (not shown in the figure) to form a squeeze film S21 in the gap between the first inner circumferential surface 22b and the first outer circumferential surface 21a.

Next, similarly to the above, the adjusting bolt 13 is rotated to threadingly move the housing 22 in the rotation axis O direction as far as to a position at which the third inner circumferential surface 22d and the second outer circumferential surface 21b faces each other as shown in FIG. 5.

When the third inner circumferential surface 22d and the second outer circumferential surface 21b face each other, the squeeze film S21 disappears and the squeeze film S22 is formed.

The outer radii of the squeeze films S21, S22 are the inner radii d1, d3 of the housing 22, respectively. When the squeeze film S22 is formed instead of the squeeze film S21, the damping coefficient C is significantly reduced.

For example, if the measured damper characteristic is by far larger than the target damper characteristic, then the squeeze film for use is altered from the squeeze film S21 to the squeeze film S22, to thereby adjust the damper characteristic so as to make the damping coefficient C smaller.

The increase/decrease in the outer radius R of the squeeze film has, as shown in Formula (1), a greater influence on the increase/decrease in the damping coefficient C than the increase/decrease in width L of the squeeze film has. Therefore, it is possible to adjust the damping coefficient C in a wider range.

As described above, according to the damper structure 20 of the present embodiment, it is possible to select either one of the squeeze films S21, S22 at different radial positions. Therefore, relative movement of the sleeve 21 and the housing 22 in the rotation axis O direction changes a squeeze film to the other squeeze film (S21, S22) at a different radial position. As a result, it is possible to significantly change the damper characteristic. Even if the measured vibration characteristic of the whole spindle shaft system is widely different from the target vibration characteristic, it is possible to adjust the vibration characteristic according to the squeeze film at different radial positions, and hence, to suppress the production of an unstable vibration.

Third Embodiment

Figure 6:
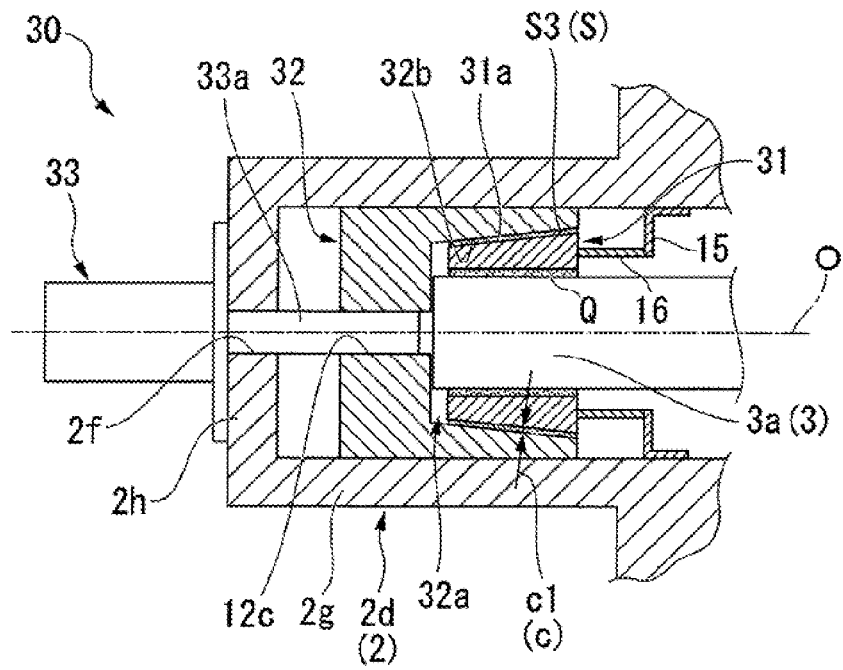
FIG. 6 is a transverse cross-sectional view showing a damper structure 30 according to a third embodiment of the present invention.
Figure 7:
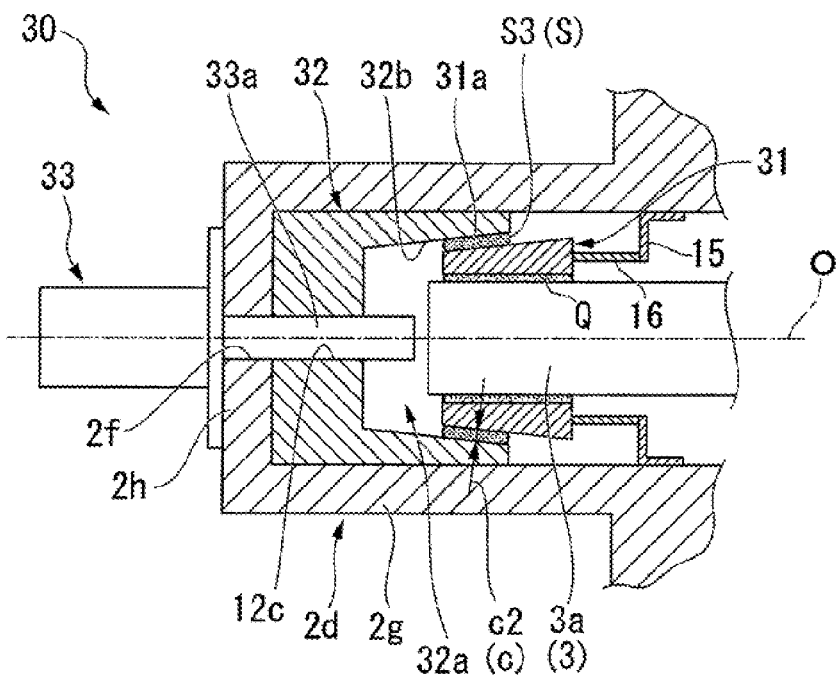
FIG. 7 is a diagram showing an operation of the damper structure 30 according to the third embodiment of the present invention.

Next is a description of a third embodiment of the present invention. The third embodiment described below is one in which the damper structure 10 of the centrifugal compressor A according to the aforementioned first embodiment (see FIG. 1) is modified. FIG. 6 is a transverse cross-sectional view showing a damper structure 30 according to the third embodiment of the present invention. In FIG. 6 and FIG. 7, constituent elements similar to those of FIG. 1 to FIG. 5 are denoted by the same reference symbols, and a description thereof is omitted.

As shown in FIG. 6, the damper structure 30 is attached to a shaft end case portion 2d, and includes a sleeve 31, a housing 32, and a servo motor 33.

The sleeve 31 is a cylindrical member. An outer circumferential surface 31a of the sleeve 31 is a tapered surface. The sleeve 31 is fitted between the housing 32 and a shaft end 3a. The sleeve 31 is secured to a portion outside the shaft end 3a. In this state, the diameter of the sleeve 31 gradually decreases as it is closer to the end of the shaft 3.

Similarly to the sleeve 11 of the first embodiment, the sleeve 31 is positioned by an annular member 15 and a centering spring 16 while surrounding the shaft end 3a with a gap being provided therebetween.

The housing 32 is substantially U-shaped, and internally has a tapered hole 32a.

The tapered hole 32a has an inner circumferential surface 32b whose diameter gradually decreases from its opening side to its bottom side. The tapered hole 32a is configured to be capable of containing the housing 32 so that an outer circumferential surface 31a of the housing 32 faces the inner circumferential surface 32b.

The housing 32 is contained in a shaft end case portion 2d of the aforementioned casing 2 so as to be internally movable in a rotation axis O direction and also unrotatable. The central axes of a tapered hole 32a and a female thread portion 12c are in line with a rotation axis O of the shaft 3.

The servo motor 33 has a motor shaft 33a that is formed with a male thread. The male thread of the motor shaft 33a is screwed into the female thread portion 12c. The servo motor 33 is controlled by a control apparatus (not shown in the figures). The rotation of the motor shaft 33a is controlled based on correspondences between the rotation angle of the motor shaft 33a and the movement amount of the housing 32.

Next is a description of how to adjust a damper characteristic of the damper structure 30 with the aforementioned construction. The whole operation of the centrifugal compressor A is similar to that in the aforementioned description. Therefore, the description thereof is omitted.

Firstly, the motor shaft 33a is rotated to threadingly move the housing 32 in the rotation axis O direction. Thereby, the inner circumferential surface 32b and the outer circumferential surface 31a face each other at a predetermined position as shown in FIG. 6. At this time, the outer circumferential surface 31a and the inner circumferential surface 32b are spaced away from each other by a distance c1 in their normal direction. Into the gap with the distance c1, oil supplied from an oil supply portion (not shown in the figures) flows, to thereby form a squeeze film S3 with a thickness of c1 between the first inner circumferential surface 22b and the first outer circumferential surface 21a.

In a state with the squeeze film S3 with the thickness of c1 being formed, the motor shaft 33a of the servo motor 33 is rotated to threadingly move the housing 32 in the rotation axis O direction so as to cause the housing 32 to be spaced away from the sleeve 31. With the threading movement of the housing 32, the distance between the outer circumferential surface 31a and the inner circumferential surface 32b is expanded from the distance c1 to the distance c2, as shown in FIG. 7.

Namely, for example, if the measured damper characteristic is by far greater than the target damper characteristic, the thickness c of the squeeze film S3 is increased from the thickness c1 to the thickness c2, to thereby adjust damper characteristic so as to decrease the damping coefficient C.

The increase/decrease in thickness c of the squeeze film has, as shown in Formula (1), a greater influence on the increase/decrease in the damping coefficient C than the increase/decrease in width L of the squeeze film has. Therefore, it is possible to adjust the damping coefficient C in a wider range.

As described above, according to the damper structure 30 of the present embodiment, the inner circumferential surface 32b of the housing 32 and the outer circumferential surface 31a of the sleeve 31 are provided with a tapered surface. Therefore, relative movement of the sleeve 31 and the housing 32 in the rotation axis O direction increases/decreases the distance between the inner circumferential surface 32b and the outer circumferential surface 31a in the normal direction. In other words, the thickness in the formation area of the squeeze film S3 is increased/decreased, which varies the thickness c of the squeeze film S3. As a result, it is possible to greatly change the vibration characteristic. Therefore, even if the measured vibration characteristic of the whole spindle shaft system is widely different from the target vibration characteristic, it is possible to adjust the vibration characteristic according to the varied thickness c of the squeeze film S3, and hence, to suppress the production of an unstable vibration.

Furthermore, because the servo motor 33 moves the housing 32, it is possible to position the housing 32 and the sleeve 31 with accuracy. Therefore, it is possible to vary the formation area of the squeeze film S3 with accuracy.

Operational procedures, or shapes, combinations and the like of the constituent members illustrated above are merely examples, and various modifications based on design requirements and the like can be made without departing from the spirit or scope of the invention.

For example, in the aforementioned embodiments, the housing 12 and the housing 22 are moved by the adjusting bolt 13 in the damper structures 10 and 20. However, the housing 12 and the housing 22 may be moved by a servo motor 33 as is the case with the damper structure 30. Similarly, in the damper structure 30, an adjusting bolt 13 may be used instead of the servo motor 33.

Furthermore, in the case of the aforementioned embodiments, a cylindrical spring member is used as the centering spring 16. However, another spring member may be used. For example, a spring member with a lightened construction in which a plurality of portions lightened along the axis line is annularly arranged in the circumferential wall of the cylinder in an evenly spaced manner, or other spring members may be used.

INDUSTRIAL APPLICABILITY

According to the damper structure of the present invention, it is possible to change the damper characteristic of the squeeze film. Therefore, even if the measured damper characteristic is different from the target damper characteristic, the damper characteristic can be adjusted to the target damper characteristic. Consequently, it is possible to bring the vibration characteristic of the whole spindle shaft system closer to the target vibration characteristic, and hence, to suppress the production of an unstable vibration of the spindle shaft.

| DESCRIPTION OF THE REFERENCE SYMBOLS | |
|---|---|
| 3: | shaft (spindle shaft) |
| 3a: | shaft end |
| 6: | bearing |
| 10, 20, 30: | damper structure |
| 11, 21, 31: | sleeve |
| 11a, 31a: | outer circumferential surface |
| 12, 22, 32: | housing |
| 12a: | cylindrical hole |
| 12b, 32b: | inner circumferential surface |
| 12c: | female thread portion |
| 12d: | bottom portion |
| 13: | adjusting bolt (moving portion) |
| 21a: | first outer circumferential surface (outer circumferential surface) |
| 21b: | second outer circumferential surface (outer circumferential surface) |
| 22b: | first inner circumferential surface (inner circumferential surface) |
| 22c: | second inner circumferential surface (inner) circumferential surface |
| 22d: | third inner circumferential surface (inner circumferential surface) |
| 33: | servo motor |
| S (S1, S21, S22, S3): | squeeze film |
| A: | centrifugal compressor |
| L: | width (length in spindle shaft direction) |
| c: | thickness |

The invention claimed is:

1. A damper structure provided on a shaft end of a spindle shaft supported by a bearing, which shaft end extends outwardly from the bearing, comprising:
   a sleeve provided around an outer circumference of the shaft end;
   a housing provided in a spaced manner from the sleeve in a radial direction of the spindle shaft; and
   a moving portion that moves the housing relative to the sleeve in a spindle shaft direction,
   wherein the sleeve, the housing and the moving portion are arranged coaxially with the shaft,
   wherein a squeeze film is formed between an outer circumferential surface of the sleeve and an inner circumferential surface of the housing that face each other, and
   wherein a formation area of the squeeze film is variable.

2. The damper structure according to claim 1,
   wherein the inner circumferential surface of the housing and the outer circumferential surface of the sleeve are each formed with a fixed diameter along the spindle shaft direction,
   wherein the squeeze film formed between the outer circumferential surface of the sleeve and the inner circumferential surface of the housing is formed in a cylindrical shape, and
   wherein a length of the squeeze film in the spindle shaft direction is variable.

3. The damper structure according to claim 2, wherein the moving portion is a servo motor.

4. A rotary machine, comprising the damper structure according to claim 3.

5. A rotary machine, comprising the damper structure according to claim 2.

6. The damper structure according to claim 1,
   wherein the inner circumferential surface of the housing and the outer circumferential surface of the sleeve are each provided with a tapered surface that gradually decreases in diameter toward either end portion in the spindle shaft direction,
   the squeeze film formed between the outer circumferential surface of the sleeve and the inner circumferential surface of the housing is formed in a tapered shape, and
   a thickness of the squeeze film in the radial direction is variable.

7. The damper structure according to claim 6, wherein the moving portion is provided with a servo motor.

8. A rotary machine, comprising the damper structure according to claim 7.

9. A rotary machine, comprising the damper structure according to claim 6.

10. The damper structure according to claim 1,
- wherein the inner circumferential surface of the housing and the outer circumferential surface of the sleeve are each provided with a plurality of stepped surfaces that are formed with different diameters so as to have a stepped shape toward a front end portion thereof in the spindle shaft direction,
- the squeeze film is formed along a position, on one-on-one basis, at which one of the stepped surfaces formed in the inner circumferential surface of the housing and one of the stepped surfaces formed in the outer circumferential surface of the sleeve face each other, and
- one of the squeeze films that are different in position in the radial direction is selectable.

11. The damper structure according to claim 10, wherein the moving portion is provided a servo motor.

12. A rotary machine, comprising the damper structure according to claim 11.

13. A rotary machine, comprising the damper structure according to claim 10.

14. The damper structure according to claim 1, wherein
the moving portion is a servo motor.

15. A rotary machine, comprising the damper structure according to claim 14.

16. A rotary machine, comprising the damper structure according to claim 1.

* * * * *